United States Patent

Olausson

[11] Patent Number: 5,454,908
[45] Date of Patent: Oct. 3, 1995

[54] RECOVERY BOILER AND METHOD OF REDUCING $NO_x$ EMISSIONS

[75] Inventor: Lars Olausson, Angered, Sweden

[73] Assignee: Gotaverken Energy AB, Goteborg, Sweden

[21] Appl. No.: 108,620

[22] PCT Filed: Mar. 4, 1992

[86] PCT No.: PCT/SE92/00134

§ 371 Date: Aug. 27, 1993

§ 102(e) Date: Aug. 27, 1993

[87] PCT Pub. No.: WO92/16688

PCT Pub. Date: Oct. 1, 1992

[30] Foreign Application Priority Data

Mar. 18, 1991 [SE] Sweden .................................. 9100814

[51] Int. Cl.⁶ ..................................................... D21C 11/12
[52] U.S. Cl. ........................... 162/31; 162/30.1; 162/252; 110/188; 110/345; 423/242.1
[58] Field of Search ........................ 423/242.1; 110/188, 110/314, 147, 345; 162/31, 30.1, 252

[56] References Cited

U.S. PATENT DOCUMENTS

| 4,359,950 | 11/1982 | Leffler et al. | 110/188 |
| 4,495,872 | 1/1985 | Shigaki | 110/188 |

FOREIGN PATENT DOCUMENTS

| 055603 | 5/1979 | Japan . |
| 54-055603 | 5/1979 | Japan . |
| 54-055604 | 5/1979 | Japan . |
| 54-059402 | 5/1979 | Japan . |
| 55-114333 | 9/1980 | Japan . |

Primary Examiner—Steve Alvo
Assistant Examiner—Dean T. Nguyen
Attorney, Agent, or Firm—Lerner, David, Littenberg, Krumholz & Mentlik

[57] ABSTRACT

The invention relates to a method of firing black liquor in recovery boilers where the intention is to obtain fumes having a low content of nitrogen oxides ($NO_x$). A part of the combustion air is added as a last portion at a very high level so that a reducing atmosphere will exist in a very great part of the boiler for a long time period, e.g. at least 3–5 seconds.

11 Claims, 2 Drawing Sheets

RECOVERY BOILER AND METHOD OF REDUCING $NO_x$ EMISSIONS

TECHNICAL FIELD

The present invention relates to a method for firing black liquor in recovery boilers. The invention comprises also a recovery boiler for carrying out the method according to the invention.

BACKGROUND OF THE INVENTION

Recovery boilers for firing black liquor obtained through digesting of cellulose have been well-known for many decades. Their purpose is both to create energy through the firing and to recover chemicals used during the digesting of the cellulose and which are released in a melt condition during the firing and tapped from the bottom part of the recovery boiler. Recovery boilers are large plants and, besides a high amount of energy and recovered chemical substances, they also generate large quantities of fumes. These fumes contain inter alia nitrogen oxides arising from the firing of the liquor. These oxides come both from nitrogen containing materials in the liquor and from the nitrogen in the combustion air. The firing in a recovery boiler occurs at a relatively low temperature, about 1.200° C., and it is presumed that the main part of the nitrogen oxides come from the black liquor.

In recent years continually stricter demands on the release of nitrogen oxides into the atmosphere have been introduced. It is commonly known that these oxides contribute to the acidifying of, and further unfavourable influence on, the nature. The contents of nitrogen oxides which are emitted from the recovery boilers of the forest industry are, however, low compared to those coming from cars, etc. Normally the contents are within 40–70 mg $NO_2$/MJ but these values will have to be lowered appreciably in the future.

The factors which influence the formation of nitrogen oxides are the amount of nitrogen in the fuel, how the nitrogen is bound, the speed of heating, the exposure time, the temperature and the content of oxygen. The most important parameter seems, however, to be the amount of oxygen supplied. By lowering the excess of air and thereby lowering the content of oxygen in the firing area, it is possible to lower the formation of nitrogen oxides. At the same time as the oxygen content sinks to a level perhaps less than 2–3 percent by volume, the contents of carbon monoxide will however increase to very high values due to the incomplete firing of carbon. It has therefore previously been proposed to maintain a low content of oxygen in the lower part of the recovery boiler for formation of a small amount of nitrogen oxides and to combine this low oxygen content with a final firing of the remaining carbon monoxide in an excess air register at a higher level in the recovery boiler. It is important that the carbon monoxide be oxidised to carbon dioxide for obtaining a satisfactory energy development, but at this latter combustion the content of nitrogen oxides also increases.

It has also been proposed to add reducing gas such as ammonia or city gas above the liquor input region to obtain a reduction of thus formed nitrogen oxides. Air has thereafter been added for final combustion of the components in the gases which can be burned to thereby develop further energy. Despite all these attempts to perform the firing in such a way that low contents of nitrogen oxides are created, a satisfactory combustion method has not yet been obtained. The contents of nitrogen oxides are still too large.

SUMMARY OF THE INVENTION

By means of the present invention, a method is provided for obtaining fumes having a low content of nitrogen oxides during the combustion of black liquor in recovery boilers, the method being characterized in that a part of the combustion air is fed as a last portion at a very highly located level so that a reducing atmosphere without extra addition of reduction gases exists from the area of the input of the black liquor to the last air addition for a period of at least 3–5 seconds.

The last portion of the combustion air can, according to the invention, be added in two stages at two highly located levels.

The amount of combustion air that, according to the invention, shall be added at this highly located level is about 5–50%, preferably 5–10% of the total combustion air.

The method according to the invention also provides for the content of nitrogen oxides in the fumes being regulated by means of a control system which automatically controls the addition of air to the different levels.

The invention also comprises a recovery boiler for firing of black liquor according to the method described. It is characterized in that, besides the conventional means for the addition of primary, secondary and tertiary combustion air, it also includes means for the addition of quarternary air at an appreciably higher level.

The recovery boiler according to the invention may have the means for the addition of quarternary air located at one or more levels about 10–20 meters above the black liquor input level.

The recovery boiler according to the invention can be provided with two rows of supply openings for feeding the quarternary air and one level can be about 13 meters and the other about 19 meters above the black liquor input level.

According to the invention, it is suitable if the uppermost air feed openings are located in the area where the boiler is most narrow, i.e. where the so called inner "nose" is arranged.

Finally, the recovery boiler according to the invention is characterized in that it includes a control system for automatically controlling the different feed streams of the combustion air.

DETAILED DESCRIPTION OF A PREFERRED EMBODIMENT

Figure 1:
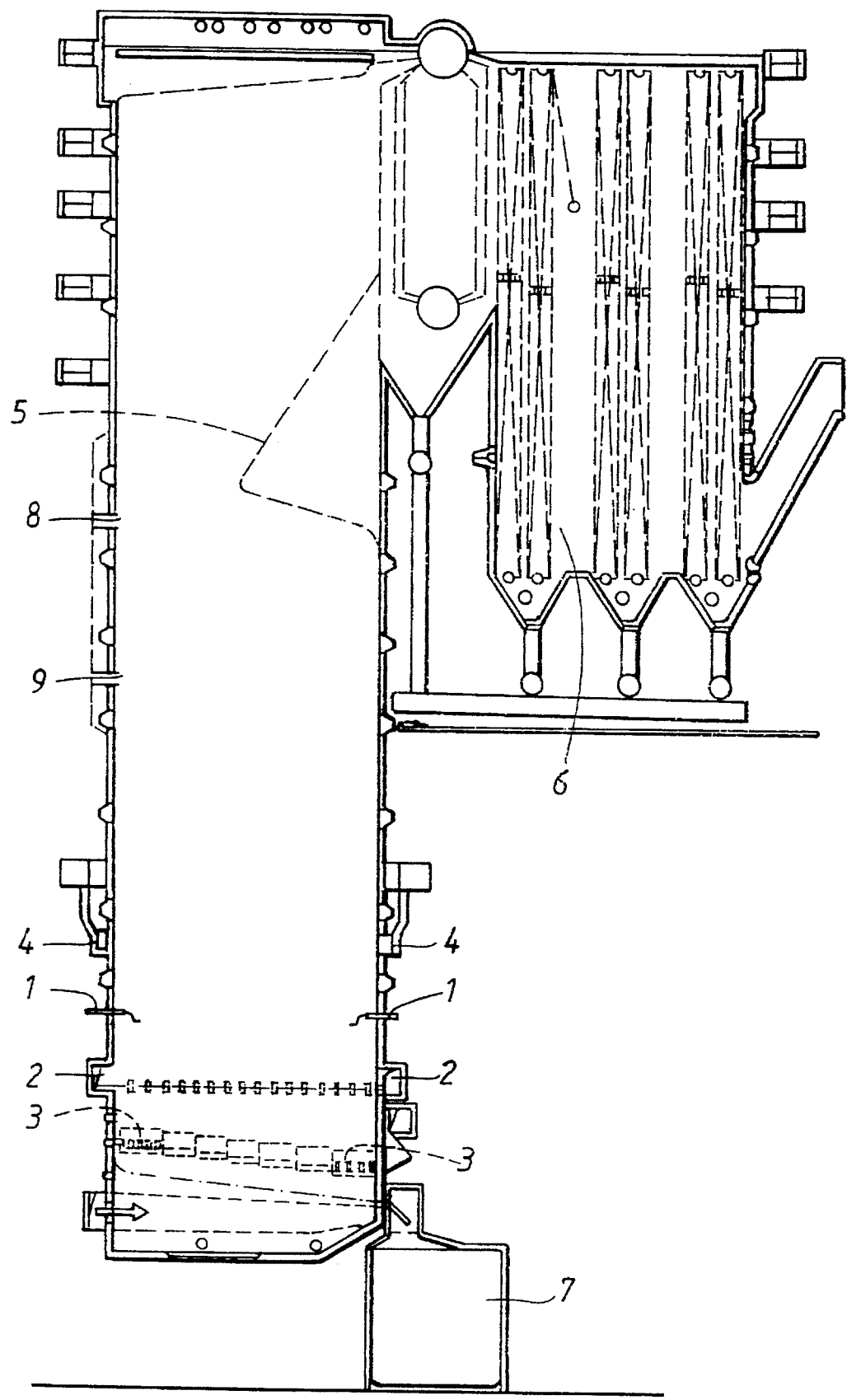
FIG. 1 is a side view drawing of a recovery boiler according to the present invention.

The recovery boiler according to FIG. 1, which is of a conventional kind, includes black liquor spray nozzles 1 located in the lower part of the recovery boiler. Below these black liquor spray nozzles 1 there are arranged openings 2 for supply of secondary air. A starting burner is also arranged at this level. Openings 3 for primary air are arranged below the openings for secondary air. Openings 4 for the supply of tertiary air are arranged above the black liquor spray nozzles 1. The boiler also includes conventional means such as the narrow part 5 in the upper part of the boiler called "the nose" and a heat exchanger 6 of conventional kind. Finally, below the boiler there is a collecting receptacle 7 for melt and recovered chemical substances which flow down along the walls of the receptacle and which substantially consist of known sodium salts.

Figure 2:
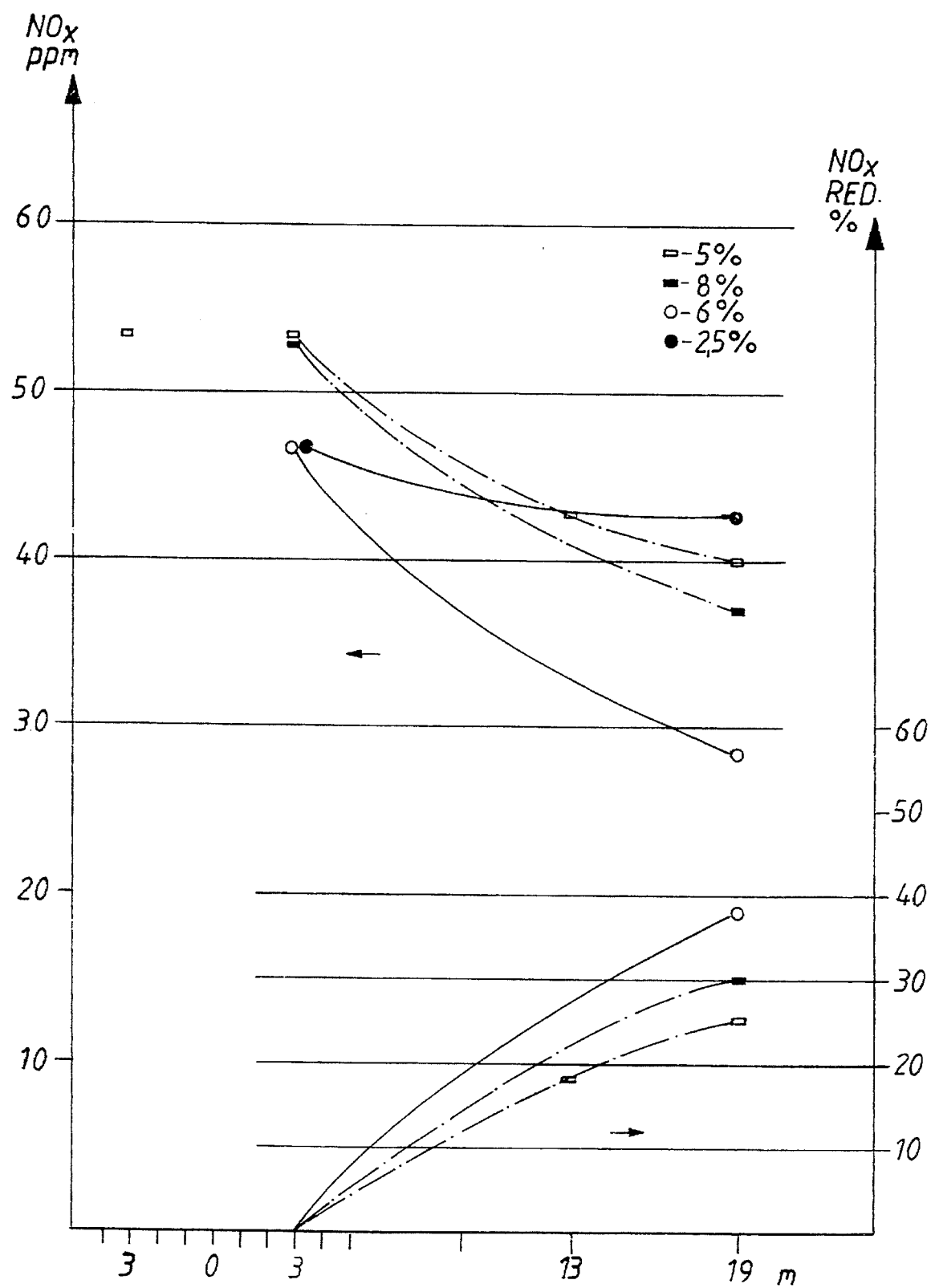
FIG. 2 is a graph of the amount of $NO_x$ reduction as a function of the distance in meters of the portion of combustion air from the black liquor spray nozzles.

At a higher level in the boiler near the area where the "nose" 5 is, according to the invention further air feeding openings 8 are arranged. These may be several, suitably eight, though the exact number is not critical. Through these air feed openings a part of the tertiary air which normally should have been fed further down at the position 4 in the boiler is added. The amount which normally is introduced at the position 4 is reduced and this amount is introduced at the highest located air supply arrangements 8. The amount of air which is added at this upper position is suitably 5–10% of the total air supplied. This means that in the area from the position 4–8 a reducing gas atmosphere is obtained which substantially contains carbon monoxide and smaller amounts of hydrogen and hydrogen sulphur as reduction agents. Carbon monoxide is a less effective reduction agent for reduction of nitrogen oxide than for instance city gas and the like but this lower reduction ability is compensated for by letting the carbon monoxide act during a longer time, namely at least 3–5 seconds, which is the time it takes for the gases from the position 4 to the position 8. At position 8 and directly thereafter the reducing gases are burned to carbon dioxide, water, etc., and dissipate the last amount of energy possible. This combustion occurs at a temperature in the order of about 900°–1.200° C., at which temperature very little nitrogen oxides are formed. Through these means a substantial reduction of the amount of nitrogen oxides is obtained. This is shown in FIG. 2 which shows the content of nitrogen oxides ($NO_x$) in the fumes in parts per million and the percentage reduction of these dependent on the distance in meters from the black liquor spray nozzles. This is self-explanatory and it can be seen that a reduction of the nitrogen oxides by up to 40% was achieved during the tests. Under favourable conditions an even higher reduction can be attained. During the tests an amount of quarternary air of 5%, 8%, 6% and 2,5% of the total combustion air amount was added at the position 8.

In FIG. 1, a further row of air inlets for the upper combustion air is shown at the position 9. These inlets can be avoided but they can also be a complement to the air inlets at the position 8. The number of air inlets at the position 9 may be the same as at position 8, suitably eight.

By arranging the upper combustion air inlet at such a high level in the boiler and by feeding a part of the combustion air at that level, which air in other cases would have been fed at the tertiary air level, so as to obtain a lower content of nitrogen oxides, it is now possible to control the content of nitrogen oxides in the fumes by varying the flow through the air inlets. According to the invention, this can be achieved automatically by measuring the content of nitrogen oxides in the fumes and, via a computer, letting these measured values control the vents for feeding the air to both the primary, secondary, tertiary and quarternary air inlets. In this way, one can compensate for variations in the quality of the fuel, etc., and at every moment obtain a minimal amount of nitrogen oxides in the fumes.

The main feature of the invention is, as said above, that the last part of the air is added at a very high level in the recovery boiler and the air amount at lower levels is reduced to such a degree that a reducing environment is attained for a very long time, approximately 3–5 seconds, in the conventional recovery boiler. This period of time is to be compared to the period of time one previously had when the last part of the air was added at the tertiary position 4 about 3 meters above the black liquor spray nozzles. This period of time was about 0.5 seconds, which now has been prolonged to about 5 seconds.

The invention has been described in connection with a recovery boiler of normal length of about 70 meters, whereby the uppermost air inlet suitably is arranged about 19 meters above the black liquor spray nozzles. In larger boilers, the same ratio between length and distance above the black liqour spray nozzles can be present. For shorter boilers, however, another ratio may be suitable since in such boilers the residing time under all circumstances can be too short for the reduction of nitrogen oxides.

The invention is not limited to the embodiment shown and described, but can be varied in different ways within the scope of the claims.

I claim:

1. A method for firing black liquor in a recovery boiler for obtaining fumes having a low content of nitrogen oxides comprising the steps of: introducing a portion of combustion air into said boiler at a distance above a black liquor inlet so as to provide a a reducing atmosphere with a residence time of at least about three seconds between said black liquor inlet and said introduction of said portion of combustion air wherein said reducing atmosphere is generated without extra addition of reduction gases.

2. The method of claim 1, wherein said introduced portion of said combustion air is added in two stages.

3. The method of claim 1, wherein the amount of said portion of combustion air that is added ranges from between about five and about 50% of the total amount of combustion air introduced into said boiler.

4. The method of claim 3, wherein said amount of said portion of combustion air that is added ranges from between about 5 and 10% of the total amount of combustion air introduced into said boiler.

5. The method of claim 1 wherein said portion of combustion air is introduced at a first point in said boiler and said black liquor is introduced at a second point in said boiler, and wherein the distance between said first point and said second point is at least 1/7th of the height of said boiler.

6. The method of claim 5 wherein said distance between said first point and said second point is at least about 10 meters.

7. The method of claim 1 further comprising the steps of measuring the content of nitrogen oxides in said boiler and adjusting the amount of at least said portion of combustion air introduced into said boiler so as to minimize the content of nitrogen oxides.

8. A recovery boiler for firing black liquor comprising: a means for introducing black liquor into said boiler, and a means for introducing a portion of combustion air into said boiler at a distance above the means for introducing black liquor, wherein said means for introducing black liquor and said means for introducing said portion of combustion air are separated by a distance which is sufficient to provide a reducing atmosphere with a residence time of at least about three seconds therebetween and wherein said distance separating said means for introducing a portion of said combustion air and said means for introducing black liquor is at least about 1/7th of the height of said boiler.

9. The recovery boiler of claim 8, wherein said means for introducing a portion of combustion air and said means for introducing black liquor are separated by a distance of at least about ten meters.

10. The recovery boiler of claim 8, wherein said means for introducing a portion of combustion air into said boiler is carried out at more than one height relative to said means for introducing said black liquor.

11. The recovery boiler of claim 8, further comprising a means for measuring the content of nitrogen oxides in said boiler and for adjusting the amount of at least said portion of combustion air introduced into said boiler so as to minimize the content of nitrogen oxides therein.

* * * * *